United States Patent Office.

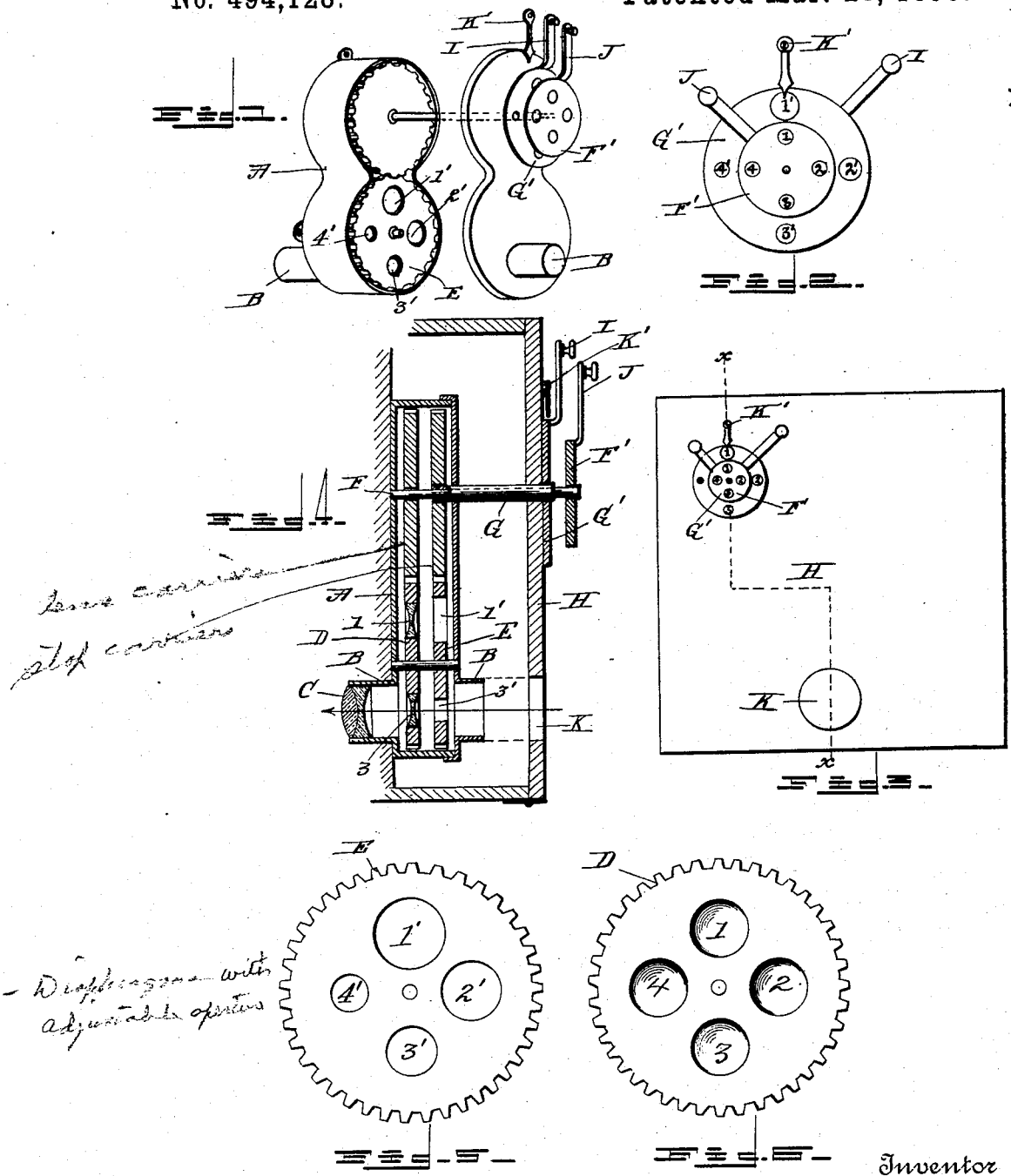

ERSKINE DECKER, OF CASSOPOLIS, MICHIGAN.

LENS FOR CAMERAS.

SPECIFICATION forming part of Letters Patent No. 494,128, dated March 28, 1893.

Application filed October 15, 1892. Serial No. 449,002. (No model.)

*To all whom it may concern:*

Be it known that I, ERSKINE DECKER, a citizen of the United States, residing at Cassopolis, in the county of Cass and State of Michigan, have invented certain new and useful Improvements in Lenses for Cameras; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain improvements in lenses, particularly to the arrangement of lenses and diaphragms in a camera and means for readily adjusting the same for instantaneous and time exposures, for rapidly photographing objects near by or at a distance, and for obtaining clear and well defined, large or small photographs of objects.

With these objects in view, the invention comprises various novel details of construction, combinations and arrangement of parts to be hereinafter more fully set forth and claimed.

In describing the invention in detail, reference is to be had to the accompanying drawings, forming part of this specification in which like letters and figures indicate corresponding parts in the several views.

Figure 1, is a perspective view, with case cover detached, of the lens tube, revolving lens and diaphragm case, gearing, rods, and levers for operating the revolving lenses and diaphragm. Fig. 2, is a front detail view of the revolving lens and diaphragm indicator plates, the index hand, and levers for operating the revolving lenses and diaphragm. Fig. 3:—is a view in front elevation showing a casing adapted for containing the device, and also showing the indicator secured in position thereon. Fig. 4:—is an enlarged view in central longitudinal section on the line —x—x— of Fig. 3 showing the parts assembled in their relative positions. Fig. 5, is a front view of the revolving diaphragm plate with a cogged or toothed circumference. Fig. 6, is a front view of the revolving lens holder with a cogged or toothed circumference.

In the drawings A refers to the revolving lens holder and diaphragm case, which may be attached to the camera frame, in any well known manner.

B is the lens tube upon which the lower part of case A is suitably mounted.

C refers to the double lens or doublet, consisting of a bi-concave and a bi-convex lens, placed in contact, as shown, and suitably mounted in the rear end of tube B, the bi-concave being in front of the bi-convex lens.

D is a revolving lens holder, circular in form, with four circular apertures equi-distant from one another and from the center of the holder. This lens holder is rigidly and centrally mounted on an axis F which is in turn centrally mounted in the upper part of case, A. Lenses 1, 2, 3, and 4, of different concavity are suitably mounted in these apertures.

E represents a diaphragm of circular form with four circular apertures of different sizes whose centers are equi-distant from one another, and from the center of the diaphragm. Diaphragm E is mounted in front of lens holder D on a hollow shaft G which revolves in place upon shaft F. The shafts F and G are so arranged that one shaft may revolve independently of the other.

H is the front of the camera or camera face, and it is provided near its bottom with a circular aperture K which is in line with lens tube of the camera.

In case a vertical shutter is used, the upper part of case A is mounted in the left hand corner of the camera frame, see Fig. 3, otherwise the case may be mounted in a vertical position with reference to the camera frame.

Shafts F and G project through the front face of the camera and have mounted on their front extremities two index dials F' and G' respectively which are fixedly secured to their shafts to revolve therewith by means of handles I, J, attached to the dials. K' is a dial indicator or pointer. The normal positions of these dials and handles are shown in Fig. 2. The lenses in the revolving lens holder, and the apertures in the diaphragm are indicated, as shown in Figs. 5 and 6, to correspond with the numbers on the dials. This order may be changed, especially in regard to the diaphragm. As shown, in the normal position, aperture in diaphragm, marked 3', and lens 3 in the revolving lens holder, would be in line with the common axis of the double lens and lens tube. Lens 3 can be of such concavity that the double lens and this lens may be used and operated to take instantaneous photographs at different distances without focusing.

Lenses 1, 2, and 4, range in different degrees of concavity. Lens 1 may be used for distances to exceed fifty feet, where a clear and well defined photograph is desired. Lens 2, similarly, may be used to photograph objects distant from about twenty five to fifty feet, and lens 4 to photograph objects within shorter distances. This order of arrangement as well as the distances may be changed.

It is evident that minor changes may be made in the arrangement of lenses and diaphragm and other parts without departing from the spirit of my invention.

What I claim, and desire to secure by Letters Patent, is—

A device of the class described, comprising a casing provided with a tube —B—, the biconvex and bi-concave lenses in the tube, the toothed disks —D—E— revolubly and concentrically mounted in the casing and having one or more openings adapted to coincide with that of the tube as the disks are rotated, the lenses in the opening of said disk —D—, and the indicator cranks —I—J— controlling and operating said disks through suitable gearing substantially as and for the purpose specified.

In testimony whereof I affix my signature in presence of two witnesses.

ERSKINE DECKER.

Witnesses:
JOEL COWGILL,
WM. P. BENNETT.